UNITED STATES PATENT OFFICE.

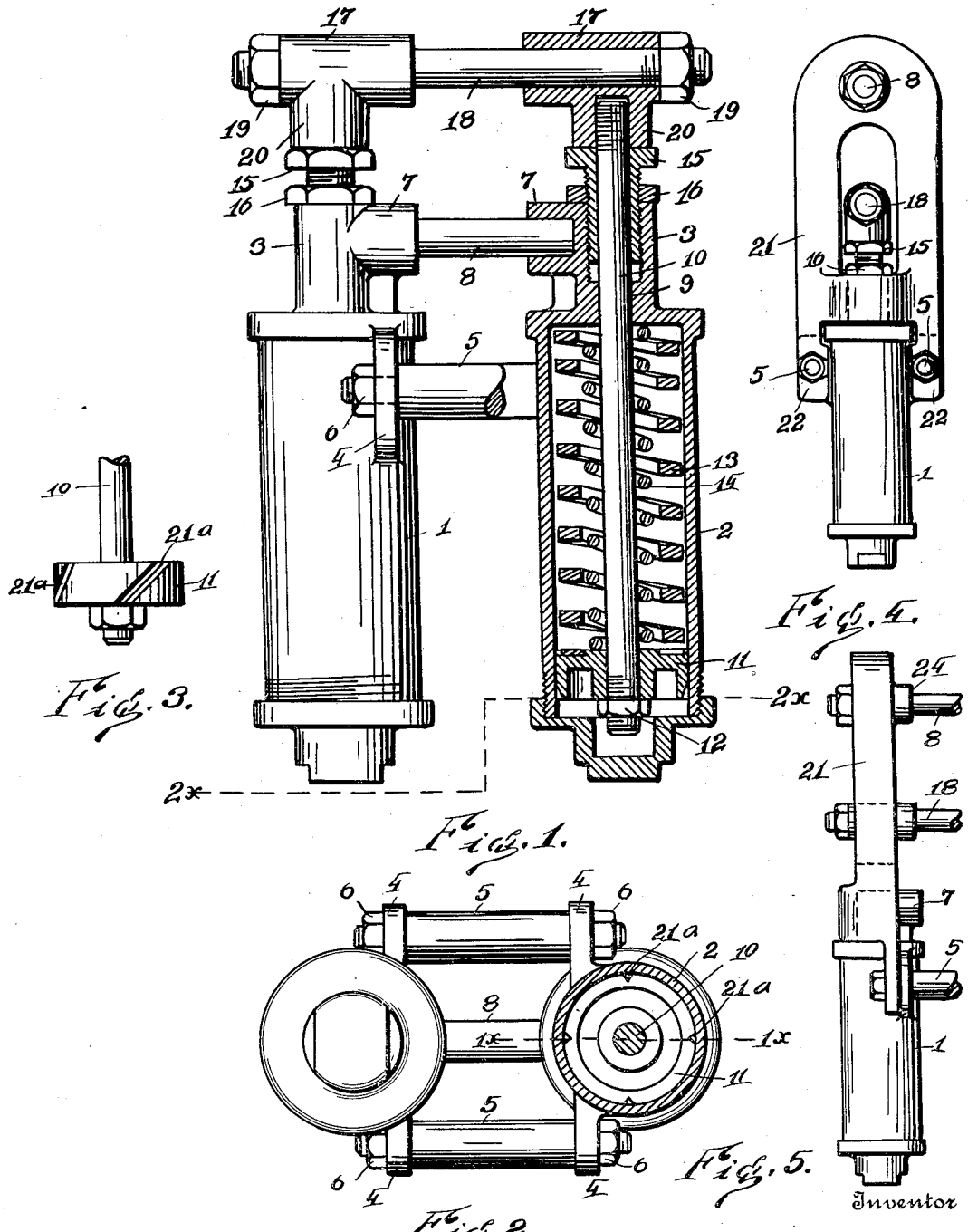

AUGUST MAGIN, OF ROCHESTER, NEW YORK.

SHOCK-ABSORBER.

1,205,368.     Specification of Letters Patent.     Patented Nov. 21, 1916.

Application filed March 14, 1916. Serial No. 84,070.

*To all whom it may concern:*

Be it known that I, AUGUST MAGIN, a citizen of the United States, residing at Rochester, in the county of Monroe and State of New York, have invented certain new and useful Improvements in Shock-Absorbers, of which the following is a specification.

The object of this invention is to construct a shock absorber in which the distance of the travel of the bearing pins toward and away from each other can be adjusted to prevent any lost motion between them.

Another object of this invention is to adjust the travel of the piston rods to eliminate the rattling of the shock absorbers while the car is running over a rough road.

These and other objects of the invention will be fully illustrated in the drawings, described in the specification and pointed out in the claims at the end thereof.

In the accompanying drawings, Figure 1 shows a side elevation of one half of the shock absorber, the other half of the shock absorber being shown in section, the section being taken on the line $1^x$—$1^x$ of Fig. 2. Fig. 2 is a bottom plan view of the shock absorber with one side thereof shown in section, the section being taken on the line $2^x$—$2^x$ of Fig. 1. Fig. 3 is a detail view of one of the pistons used in the shock absorber. Fig. 4 is an end elevation of the shock absorber with a bracket attached thereto with which it may be fastened to a different form of support. Fig. 5 is a side elevation of a part of the shock absorber shown in Fig. 4.

In the drawings like reference numerals indicate like parts.

The shock absorber shown in the accompanying drawings is constructed to supplement the action of the vehicle springs to which it is attached and not to increase the resiliency thereof. For this purpose the shock absorber is provided with an adjustment with which the travel of the piston rods can be restricted to the proper length.

As shown in the figures, the shock absorber consists of a pair of cylinders 1 and 2. Each of these cylinders has a reduced neck 3 at the top and a pair of lugs 4, 4, one on each side thereof, integral therewith. (See Figs. 1 and 2.) The cylinders 1 and 2 are rigidly fastened together and properly spaced apart by means of the bolts 5, 5, each of which has a shoulder with a reduced and threaded end on both sides thereof. These ends pass through suitable openings in the lugs 4, 4 and are rigidly clamped thereto by means of the nuts 6, 6 which engage the threaded ends of the bolts 5, 5. On each of the necks 3 is provided a boss 7, in each of which is formed a bearing for the ends of the bearing pin 8. This bearing pin is mounted to turn in its bearing and is held in place by the spacing bolts 5, 5 which also hold the cylinders 1 and 2 and in turn the bosses 7 rigidly in place. The necks 3 are provided with a longitudinal opening 9 through which pass the piston rods 10. These piston rods carry on their lower ends the pistons 11 which are held thereon by means of the nuts 12. Between the pistons 11 and the top of the cylinders 1 and 2 are interposed two compression springs 13 and 14. As shown in Figs. 2 and 3 the pistons 11 are fluted for a purpose that will presently appear.

The bottoms of the cylinders 1 and 2 are closed with caps which are threaded on the inside to engage with the male thread cut on the end of each cylinder. The upper end of each of the openings in the neck 3 is threaded to receive a bushing 15 which can be adjusted in or out therein. A lock nut 16 is provided on each of these bushings with which the bushings are held in place after they have been adjusted. At the top the piston rods 10 are provided with the bearings 17 which are fastened thereto in any suitable manner, being preferably threaded and brazed into them. The ends of a second bearing pin 18 pass through the bearings 17 and are supported thereby. Nuts 19 engage the threaded ends of this bearing pin 18 and hold it against longitudinal movement, but allow the pin to turn or rock in the bearings.

In use this shock absorber is interposed between the body and axle of an automobile in the ordinary manner, the bearing pin 18 being connected directly or indirectly to the axle and the bearing pin 8 being connected directly or indirectly to the body of the car, the ordinary method of fastening being to the springs that are connected to these two parts of the car.

In operation the bushings 15 are so adjusted and held in place by means of the lock nuts 16 that the upper edges of the bushings rest against the bosses 20 on the bearings 17 when the car is at rest or is running over a smooth road, so that when the car travels over a rough road the leaf springs will be the first to react until the obstructions in the road succeed each other so rapidly that the leaf springs of the car cannot take care of the vibration caused thereby, at which point the shock absorber springs begin to act and supplement the action of the leaf springs and take up the rapid vibration. The springs of the shock absorber are so adjusted that they force the piston and piston rods back to their normal position in which the bosses 20 rest against the bushing 15 as soon as the rapid vibrations caused by the road have ceased. This allows the leaf springs to straighten out while the bearing pins 8 and 18 act as a shackle without any lost motion between them.

In the present style of all shock absorbers the space between the boss 20 and the top of the neck 3 is left free which prevents the adjustment of the shock absorber springs so that they start to give long before the leaf springs have been bent to a point where a coöperation and supplemental action of the shock absorber springs is desirable. The leaf springs are therefore always in a very unstable condition which not only defeats the purpose of the action of the shock absorber but also makes the shock absorber rattle. This rattling is caused by the fact that the piston rods are never fully at rest so that the bosses 20 keep striking against the top of the neck 3. This cannot happen when the bushings 15 interpose between the necks 3 and the bosses 20, in which case the bosses and bushings strike each other but once during each action of the shock absorber, namely when the pistons are forced back to rest by the springs after which both the bosses and bushings are held firmly in contact with each other.

As shown in Figs. 2 and 3 the piston 11 is fluted on the outside. Each of the flutes 21ª is cut at an angle into the periphery of the piston to increase the resistance of the air while passing from one side of the piston to the other. The piston makes good frictional contact with the inner walls of the cylinders and the air trapped below the piston is slightly compressed on the return stroke thereof and acts as a cushion for the piston and prevents the spring from forcing the piston back to its normal position until the air below the piston has passed through the flutes above the piston. In this manner the quick action of the springs in the shock absorber is checked to such an extent that the bosses 20 and bushings 15 do not strike each other with any considerable force but move slowly until they come in contact with each other.

In Figs. 4 and 5 I have shown brackets 21 fastened to the lugs 4, 4 of the cylinders 1 and 2. These brackets are used when the shock absorber is suspended with the shackle in the reverse position. As shown in Figs. 4 and 5, the brackets 21 have the ears 22, 22 integral therewith. These ears are clamped to the lugs 4, 4 by means of the bolts 5, 5 in the manner shown in Fig. 5. A part of the central portion of each of the brackets 21 is semi-circular in shape and embraces a portion of the neck 3. The upper part of the bracket is U-shaped to permit the bearings 17 which carry the pin 18 to move up and down therein. On the upper end of this bracket is provided a boss 24 in which the bearing is formed for the pin 8. This pin is held in this bearing in the manner described in connection with the pin 18 and its bearings 17. It will be understood that when this form of suspension is used the bearing pin 8 is transferred from the bearings in the bosses 7, 7 to the bearings in the bosses 24 and no pin is used between the bosses 7, 7.

I claim:

1. In a shock absorber the combination of a pair of bearing pins held yieldably spaced apart, a pair of rods on which one of said bearing pins is mounted to move toward and away from the other of said pins, adjustable means on said rods and interposed between said pins to increase or decrease the distance between said pins.

2. In a shock absorber the combination of a pair of bearing pins, a pair of rods on which one of said pins is mounted to move toward and away from the other, adjustable means on said rods interposed between said pins to hold said pins apart, yieldable means to resist the force acting on said pins tending to move said pins away from each other.

3. In a shock absorber the combination of a pair of bearing pins, a pair of rods on which one of said pins is mounted to move toward and away from the other, adjustable means on said rods to space said pins apart from each other and yieldable means to allow said pins to move away from each other.

4. In a shock absorber the combination of a pair of cylinders, a pair of lugs on the sides of each of said cylinders, spacing bolts clamped between said lugs to hold said cylinders together, a piston mounted to slide in each of said cylinders, a piston rod fastened to each of said pistons and passing through the top of said cylinders, a pair of bearings pins, one of said bearing pins being mounted to rock between the ends of said piston rods, the other of said bearing pins being mounted to rock between said cylinders.

5. In a shock absorber the combination of a pair of cylinders, a pair of lugs on the sides of each of said cylinders, spacing bolts clamped between said lugs to hold said cylinders together, a piston mounted to slide in each of said cylinders, a piston rod fastened to each of said pistons and passing through the top of said cylinders, each of said piston to the other side of said piston, permit the passage of air from one side of said pistons to the other side of said piston, a pair of bearing pins, one of said bearing pins being mounted to rock between the ends of said piston rods, the other of said bearing pins being mounted to rock between said cylinders.

6. In a shock absorber the combination of a pair of cylinders, a pair of lugs on the sides of each of said cylinders, spacing bolts clamped between said lugs to hold said cylinders together, a piston mounted to slide in each of said cylinders, a piston rod fastened to each of said pistons and passing through the top of said cylinders, each of said pistons being fluted on the outside to permit the passage of air from one side of said piston to the other side of said piston, a pair of bearing pins, one of said bearing pins being mounted to rock between the ends of said piston rods, the other of said bearing pins being mounted to rock between said cylinders, an adjustable bushing inserted between the upper ends of each of said cylinders and the ends of said piston rods to hold the top of said piston rods away from the top of said cylinders.

In testimony whereof I affix my signature.

AUGUST MAGIN.